(12) United States Patent
Kurapati

(10) Patent No.: US 7,581,237 B1
(45) Date of Patent: Aug. 25, 2009

(54) METHOD AND APPARATUS FOR GENERATING TELEVISION PROGRAM RECOMMENDATIONS BASED ON PRIOR QUERIES

(75) Inventor: Kaushal Kurapati, Yorktown Heights, NY (US)

(73) Assignee: PACE PLC, West Yorkshire (GB)

( * ) Notice: Subject to any disclaimer, the term of this patent is extended or adjusted under 35 U.S.C. 154(b) by 1218 days.

(21) Appl. No.: 09/699,573

(22) Filed: Oct. 30, 2000

(51) Int. Cl.
*G06F 13/00* (2006.01)
*G06F 3/00* (2006.01)
*H04N 5/445* (2006.01)

(52) U.S. Cl. .................. 725/46; 725/47; 725/120; 725/121; 707/3; 707/5; 707/7; 707/10

(58) Field of Classification Search .......... 725/44, 725/45, 46, 47, 39, 131, 132, 140, 141, 151, 725/152, 120, 121; 707/3, 5, 7, 10
See application file for complete search history.

(56) References Cited

U.S. PATENT DOCUMENTS

| | | | | |
|---|---|---|---|---|
| 5,758,257 | A * | 5/1998 | Herz et al. .................. 725/116 |
| 5,798,785 | A * | 8/1998 | Hendricks et al. ............. 725/46 |
| 5,991,735 | A * | 11/1999 | Gerace ........................ 705/10 |
| 6,005,597 | A | 12/1999 | Barrett et al. ................. 348/1 |
| 6,006,225 | A * | 12/1999 | Bowman et al. ............... 707/5 |
| 6,614,987 | B1 * | 9/2003 | Ismail et al. ................. 386/83 |
| 6,704,931 | B1 * | 3/2004 | Schaffer et al. ............... 725/46 |
| 6,727,914 | B1 | 4/2004 | Gutta |
| 6,766,525 | B1 * | 7/2004 | Lee et al. ....................... 725/46 |
| 6,813,775 | B1 * | 11/2004 | Finseth et al. ................. 725/46 |
| 7,096,486 | B1 * | 8/2006 | Ukai et al. .................... 725/58 |
| 2005/0149964 | A1 * | 7/2005 | Thomas et al. ................. 725/9 |

FOREIGN PATENT DOCUMENTS

| | | |
|---|---|---|
| WO | WO9837696 | 9/1998 |
| WO | WO9904561 | 1/1999 |
| WO | WO9907142 | 2/1999 |
| WO | WO9945700 | 9/1999 |
| WO | WO9945702 | 9/1999 |
| WO | WO9960783 | 11/1999 |
| WO | 0010327 A1 | 2/2000 |
| WO | 2006054222 A1 | 5/2006 |

\* cited by examiner

*Primary Examiner*—Hunter B. Lonsberry
(74) *Attorney, Agent, or Firm*—Nixon Peabody LLP

(57) ABSTRACT

A method and apparatus are disclosed that generate television program recommendations based on queries that have previously been performed by a user on an electronic program guide. A conventional program recommender score for a given program is adjusted according to the degree of correlation between the attribute-value pairs that define the program and the attribute-value pairs that have previously been searched by the user. A historical search database indicates the number of times each attribute-value pair appears in a user query and provides additional information regarding the preferences of the user. Higher frequency counts for certain attribute-value pairs imply the user's preference for programs conforming to such criteria.

17 Claims, 4 Drawing Sheets

VIEWER PROFILE
200

|  | ATTRIBUTE 240 | NUMERICAL (OR SYMBOLIC) REPRESENTATION 250 |
|---|---|---|
| 205 | CHANNEL 2 | 3 |
| 206 | CHANNEL 4 | 4 |
| 207 | CHANNEL 7 | 3 |
| 208 | ○ ○ ○ |  |
| 209 | SPORTS CHANNEL | 7 |
| ○ ○ ○ | MUSIC CHANNEL | 2 |
|  | ○ ○ ○ |  |
| 210 | MORNING PROGRAMS | 1 |
| 211 | EARLY AFTERNOON PROGRAMS | 3 |
| 212 | LATE AFTERNOON PROGRAMS | 7 |
| 213 | EVENING PROGRAMS | 5 |
|  | ○ ○ ○ |  |

FIG. 2

PROGRAM DATABASE
300

| | DATE/TIME 340 | CHANNEL 345 | TITLE 350 | GENRE 355 | ... | RECOMMENDER SCORE (R) 370 | ADJUSTED RECOMMENDER SCORE (A) 380 |
|---|---|---|---|---|---|---|---|
| 305 | 11/18/99 -- 8:00 P.M. | CH1 | LUCY | COMEDY | | 55 | 61 |
| 310 | 11/18/99 -- 8:30 P.M. | CH1 | AL'S FAMILY | SITCOM | | 78 | 78 |
| | ooo | | | | | | |
| 320 | 11/18/99 -- 9:00 P.M. | CH3 | YOUR HOUSE | DRAMA | | 96 | 100 |

FIG. 3

HISTORICAL SEARCH DATABASE
400

| | ATTRIBUTE-VALUE PAIR 450 | FREQUENCY OF USAGE IN A QUERY 460 | NORMALIZED FREQUENCY OF USAGE (N) 470 |
|---|---|---|---|
| 405 | GENRE: COMEDY | 5 | 1 |
| 410 | GENRE: DRAMA | 3 | 0.6 |
| ooo | | | |
| 415 | GENRE: SITCOM | 4 | 0.8 |
| ooo | | | |

FIG. 4

METHOD AND APPARATUS FOR GENERATING TELEVISION PROGRAM RECOMMENDATIONS BASED ON PRIOR QUERIES

FIELD OF THE INVENTION

The present invention relates to television program recommenders, and more particularly, to a method and apparatus for generating television program recommendations based on the queries that have been performed by a user on an electronic program guide.

BACKGROUND OF THE INVENTION

As the number of channels available to television viewers has increased, along with the diversity of the programming content available on such channels, it has become increasingly challenging for television viewers to identify television programs of interest. Historically, television viewers identified television programs of interest by analyzing printed television program guides. Typically, such printed television program guides contained grids listing the available television programs by time and date, channel and title. As the number of television programs has increased, it has become increasingly difficult to effectively identify desirable television programs using such printed guides.

More recently, television program guides have become available in an electronic format, often referred to as electronic program guides (EPGs). Like printed television program guides, EPGs contain grids listing the available television programs by time and date, channel and title. Some EPGs, however, allow television viewers to sort or search the available television programs in accordance with personalized preferences. In addition, EPGs allow for on-screen presentation of the available television programs.

While EPGs allow viewers to identify desirable programs more efficiently than conventional printed guides, they suffer from a number of limitations, which if overcome, could further enhance the ability of viewers to identify desirable programs. For example, many viewers have a particular preference towards, or bias against, certain categories of programming, such as action-based programs or sports programming. Thus, the viewer preferences can be applied to the EPG to obtain a set of recommended programs that may be of interest to a particular viewer.

Thus, a number of tools have been proposed or suggested for recommending television programming. The Tivo™ system, for example, commercially available from Tivo, Inc., of Sunnyvale, Calif., allows viewers to rate shows using a "Thumbs Up and Thumbs Down" feature and thereby indicate programs that the viewer likes and dislikes, respectively. Thereafter, the TiVo receiver matches the recorded viewer preferences with received program data, such as an EPG, to make recommendations tailored to each viewer.

Such tools for generating television program recommendations provide selections of programs that a viewer might like, based on their prior viewing history. Even with the aid of such program recommenders, however, it is still difficult for a viewer to identify programs of interest from among all the options. Furthermore, currently available tools that search the electronic program guide based on a user-defined query require several button clicks before the user can review the list of programs satisfying the query. In addition, there is currently no way to integrate the explicit information ascertained from the queries performed by a user on the electronic program guide with the implicit information ascertained from the user's viewing habits.

A need therefore exists for a method and apparatus for recommending television programs based on the queries that have been performed by a user on the electronic program guide.

SUMMARY OF THE INVENTION

Generally, a method and apparatus are disclosed for generating television program recommendations based on the queries that have been performed by a user on an electronic program guide. The present invention adjusts a conventional program recommender score based on the previous searches that have been executed by the user. In particular, the conventional program recommender score for a given program is adjusted according to the degree of correlation between the attribute-value pairs that define the program and the attribute-value pairs that have previously been searched by the user.

A historical search database is maintained to indicate the number of times each attribute-value pair appears in a user query. Each time a manual or automatic search is initiated by the user, the query is decomposed to identify the attribute-value pairs specified by the user. The historical search database captures the search activity of a user and provides additional information regarding the preferences of the user. Higher frequency counts for certain attribute-value pairs imply the user's preference for programs conforming to such criteria.

A more complete understanding of the present invention, as well as further features and advantages of the present invention, will be obtained by reference to the following detailed description and drawings.

BRIEF DESCRIPTION OF THE DRAWINGS

FIG. 2 is a sample table from the viewer profile database of FIG. 1;

FIG. 3 is a sample table from the program database of FIG. 1;

FIG. 4 is a sample table from the historical search database of FIG. 1; and

DETAILED DESCRIPTION

Figure 1:
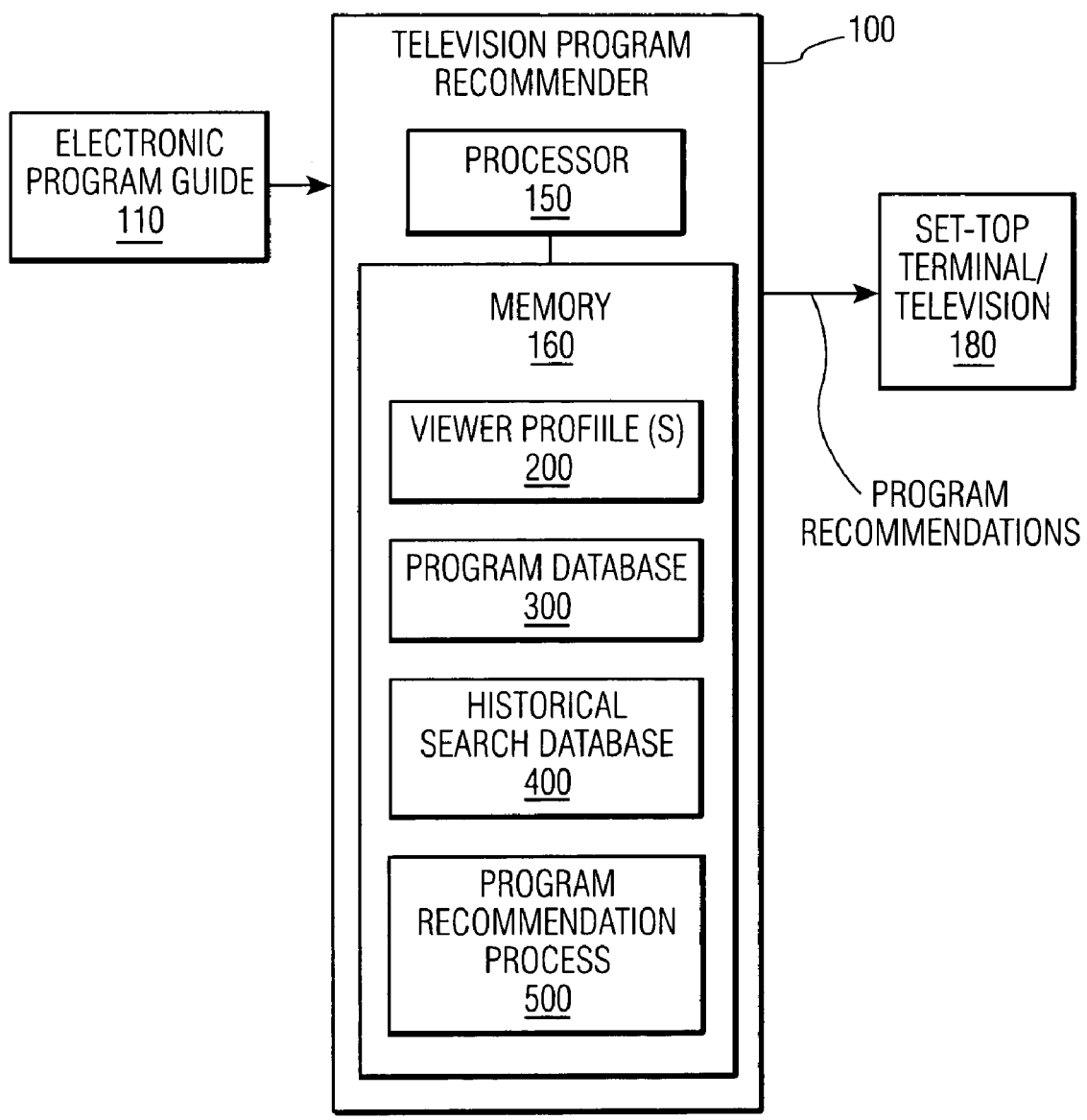
FIG. 1 illustrates a television programming recommender in accordance with the present invention.

FIG. 1 illustrates a television programming recommender 100 in accordance with the present invention. As shown in FIG. 1, the television programming recommender 100 evaluates each of the programs in an electronic programming guide (EPG) 110 to identify programs of interest to a particular viewer. The set of recommended programs can be presented to the viewer, for example, using a set-top terminal/television 180 using well known on-screen presentation techniques.

According to one feature of the present invention, the television programming recommender 100 generates television program recommendations based on the queries that have been performed by a user on the electronic program guide 110. As discussed further below, the program recommender score generated in accordance with conventional techniques is adjusted based on previous searches that have been executed by the user. In particular, the conventional program recommender score for a given program is adjusted according to the degree of correlation between the attributes of the program and the attributes that have previously been searched by the user.

Generally, each time a manual or automatic search is initiated by the user using one or more query commands, the television programming recommender 100 decomposes the query to identify the attribute-value pairs specified by the user. A historical search database 400, discussed below in conjunction with FIG. 4, is maintained to indicate the number of times each attribute-value pair has appeared in a user query. Thus, the corresponding count value is incremented in the historical search database 400 for each attribute-value pair appearing in the decomposed query. In this manner, the historical search database 400 captures the user's search activity and thus provides additional information regarding the user's preferences. Higher frequency counts for certain attribute-value pairs imply the user's preference for programs conforming to such criteria.

The television program recommender 100 may be embodied as any computing device, which includes a computer readable medium containing computer readable code, such as a personal computer or workstation, containing a processor 150, such as a central processing unit (CPU), and memory 160, such as RAM and ROM. In addition the television programming recommender 100 may be the Tivo® system, commercially available from Tivo, Inc., of Sunnyvale, Calif., or the television program recommenders described in U.S. Pat. No. 6,727,914 to Gutta and U.S. Pat. No. 7,051,352 to Schaffer, or any combination thereof, as modified herein to carry out the features and functions of the present invention.

As shown in FIG. 1, and discussed further below in conjunction with FIGS. 2 through 5, respectively, the memory 160 of the television programming recommender 100 includes one or more viewer profile(s) 200, a program database 300, a historical search database 400 and a program recommendation process 500. Generally, the illustrative viewer profile 200 indicates a viewer's relative level of interest for each program attribute. The program database 300 records information for each program that is available in a given time interval. The historical search database 400 indicates the number of times each attribute-value pair has appeared in a user query. Finally, the program recommendation process 500 generates recommendation scores for each program in a particular time interval, taking into account previous queries that have been performed on the electronic program guide (EPG) 110 in accordance with the present invention.

FIG. 2 is a table illustrating an exemplary viewer profile 200. It is noted that the viewer profile 200 may be associated with a specific user or a group of individuals, such as a household, as would be apparent to a person of ordinary skill in the art. It is noted further that the viewer profile 200 may be generated explicitly, based on responses to a survey, or implicitly, based on the set of shows that were watched (and/or not watched) by the viewer over a period of time, or a combination of the foregoing.

As shown in FIG. 2, the viewer profile 200 contains a plurality of records 205-213 each associated with a different program attribute. In addition, for each attribute set forth in column 240, the viewer profile 200 provides a numerical representation in column 250, indicating the relative level of interest of the viewer in the corresponding attribute. As discussed below, in the illustrative viewer profile 200 set forth in FIG. 2, a numerical scale between 1 ("hate") and 7 ("love") is utilized. For example, the viewer profile 200 set forth in FIG. 2 has numerical representations indicating that the user particularly enjoys programming on the Sports channel, as well as late afternoon programming.

Although the viewer profile 200 is illustrated using an explicit viewer profile, the viewer profile 200 may also be embodied using an implicit profile, or a combination of implicit and explicit profiles, as would be apparent to a person of ordinary skill in the art. For a discussion of a television program recommender 100 that employs both implicit and explicit profiles to obtain a combined program recommendation score, see, for example, U.S. patent application Ser. No. 09/666,401, filed Sep. 20, 2000, entitled "Method And Apparatus For Generating Recommendation Scores Using Implicit And Explicit Viewing Preferences,", incorporated by reference herein.

In an exemplary embodiment, the numerical representation in the viewer profile 200 includes an intensity scale such as:

| Number | Description |
|--------|-------------|
| 1 | Hates |
| 2 | Dislikes |
| 3 | Moderately negative |
| 4 | Neutral |
| 5 | Moderately positive |
| 6 | Likes |
| 7 | Loves |

FIG. 3 is a sample table from the program database 300 of FIG. 1 that records information for each program that is available in a given time interval. The data that appears in the program database 300 may be obtained, for example, from the electronic program guide 110. As shown in FIG. 3, the program database 300 contains a plurality of records, such as records 305 through 320, each associated with a given program. For each program, the program database 300 indicates the date/time and channel associated with the program in fields 340 and 345, respectively. In addition, the title and genre for each program are identified in fields 350 and 355. Additional well-known attributes (not shown), such as actors, duration, and description of the program, can also be included in the program database 300.

The program database 300 may also optionally record an indication of the recommendation score (R) assigned to each program by the television programming recommender 100 in field 370. In addition, the program database 300 may also optionally indicate in field 370 the adjusted recommendation score (A) assigned to each program by the television programming recommender 100 in accordance with the present invention. In this manner, the numerical scores, as adjusted by the present invention, can be displayed to the user in the electronic program guide with each program directly or mapped onto a color spectrum or another visual cue that permits the user to quickly locate programs of interest.

As previously indicated, the historical search database 400 indicates the number of times each attribute-value pair has appeared in a manual or automatic user query. As shown in FIG. 4, the historical search database 400 is comprised of a plurality of records, such as records 405 through 415, each associated with a given attribute-value pair. For each attribute-value pair, the historical search database 400 indicates the corresponding number of times the attribute-value pair has appeared in a user query (frequency of usage). As previously indicated, each time a manual or automatic search is initiated by the user, the television programming recommender 100 decomposes the query and increments the counter in the historical search database 400 for each attribute-value pair appearing in the decomposed query.

In addition, in order to facilitate the calculations performed by the program recommendation process 500, discussed below, the historical search database 400 optionally indicates a normalized frequency of usage term, N, in field 470. For example, the normalized score, N, indicated in field 470 can be obtained by performing a linear mapping of the actual frequency of usage term to a value between zero and one for each of the various attribute-value pairs associated with an attribute. In an exemplary embodiment, the normalization in the historical search database 400 includes a frequency of usage scale such as:

| Actual Value | Normalized Value |
|---|---|
| 0 | 0 |
| 0.2 (MAX VALUE) | 0.2 |
| 0.4 (MAX VALUE) | 0.4 |
| 0.6 (MAX VALUE) | 0.6 |
| 0.8 (MAX VALUE) | 0.8 |
| MAX VALUE | 1.0 |

In an alternate implementation, the normalization in the historical search database 400 can be obtained by plotting a curve through the various frequency count values for each of the various attribute-value pairs associated with an attribute, in a known manner.

Figure 5:
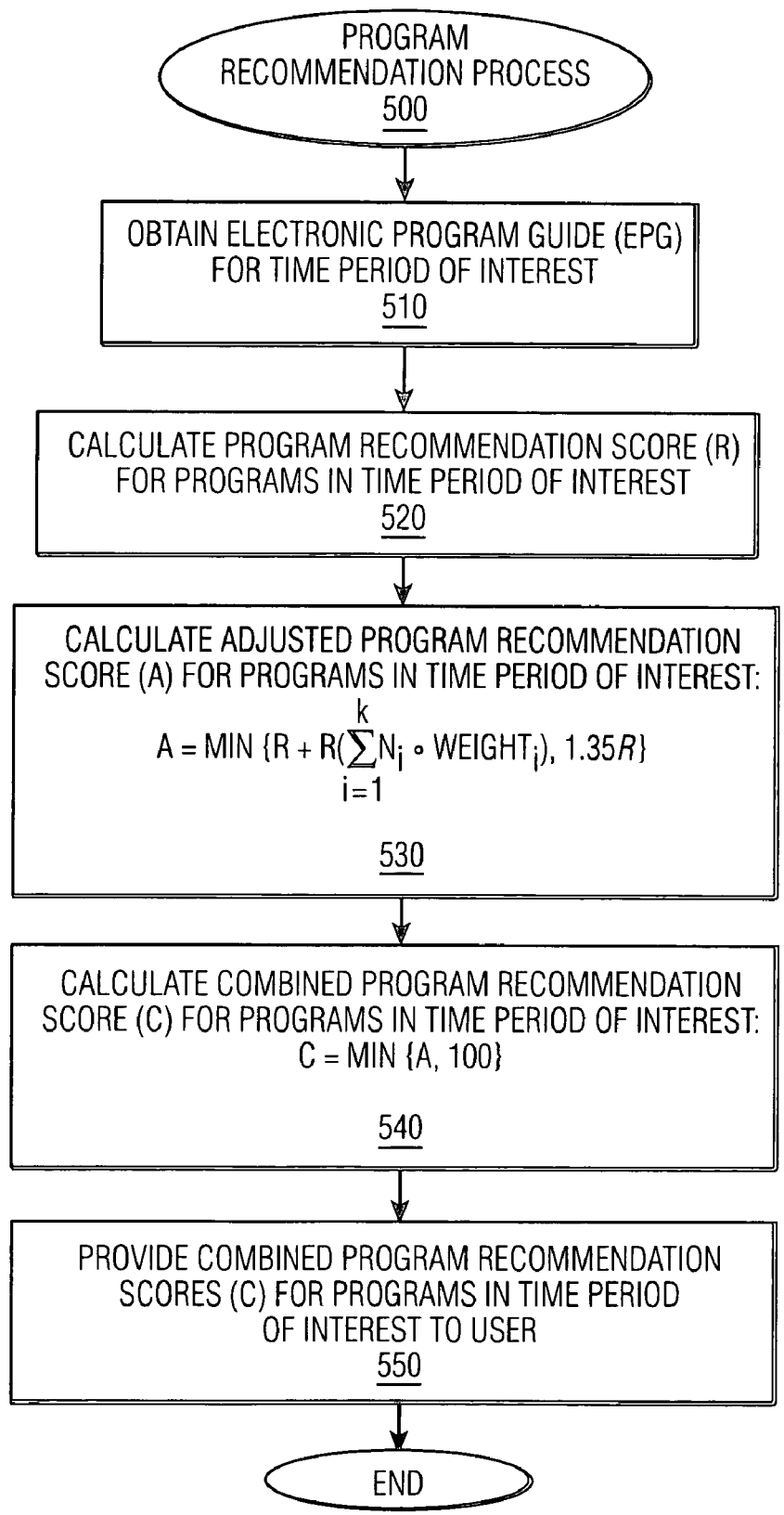
FIG. 5 is a flow chart describing an exemplary program recommendation process embodying principles of the present invention.

FIG. 5 is a flow chart describing an exemplary program recommendation process 500 embodying principles of the present invention. As shown in FIG. 5, the program recommendation process 500 initially obtains the electronic program guide (EPG) 110 during step 520. Thereafter, the program recommendation process 500 calculates the program recommendation score, R, during step 520 for each program in the time period of interest in a conventional manner (or obtains the program recommendation score, R, from a conventional recommender).

Thereafter, the program recommendation process 500 calculates the adjusted program recommendation score, A, during step 530 for each program in the time period of interest, as follows:

$$A = \text{MIN}\left\{R + R\left(\sum_{i=1}^{k} N_i \cdot \text{WEIGHT}_i\right), 1.35R\right\}$$

where k is the total number of attribute-value pairs indicated in the field 470 of the historical search database 400. Generally, the calculation performed during step 530 ensures that the adjustment to the conventional program recommendation score, R, does not exceed an exemplary value of 35%, i.e., a maximum of 135% of the conventional recommender score, R. In addition, the adjustment to the conventional program recommendation score assigned to a given program is obtained by summing the weighted normalized frequency of usage term, N, for each attribute-value pair associated with the program that has been previously searched by the user.

The $\text{WEIGHT}_i$ contribution of each attribute within a television program may be established by the user, or empirically determined. For example, the date/time attribute can be assigned a weight of 5%, the genres attribute can be assigned a weight of 20%, and the channel attribute can be assigned a weight of 10%. Thus, if a given program is a comedy, the adjustment to the conventional program recommendation score, R, attributable to the "genre=comedy" attribute value pair will be 0.8 (N) multiplied by 20%, the weight assigned to the genre attribute.

The program recommendation process 500 calculates the combined program recommendation score, C, during step 540 for each program in the time period of interest, as follows:

$$C = \text{MIN}\{A, 100\}$$

Thus, in addition to ensuring that the adjustment to the conventional program recommendation score, R, does not exceed an exemplary value of 35% (see step 530 above), the exemplary program recommendation process 500 also ensures during step 540 that the combined program recommendation score, C, does not exceed 100% (the maximum score).

Finally, the program recommendation process 500 provides the combined program recommendation scores (C) for the programs in the time period of interest to the user during step 550, before program control terminates.

In further variations of the program recommendation process 500, the adjusted program recommendation score, A, may be calculated during step 530 using a bonus scoring system, wherein a predefined or fixed bonus is determined, for example, based on the number of attribute-value pairs that define the program that have previously been searched by the user. In other words, a bonus can be determined based on the number of attribute-value pairs that match the current program with those in the historical search database 400. For example, if four attribute-value pairs in the historical search database 400 match attribute-value pairs of the current program, then a bonus of, e.g., 10% may be awarded to increase the conventional program recommender score, R, by 10%.

It is to be understood that the embodiments and variations shown and described herein are merely illustrative of the principles of this invention and that various modifications may be implemented by those skilled in the art without departing from the scope and spirit of the invention.

What is claimed is:

1. A method for recommending television programs, comprising the steps of:

obtaining a list of one or more programs;

obtaining a recommendation score, R, for said one or more programs based on a viewing history;

calculating an adjustment, A, to said recommendation score, R, for said one or more programs based on one or more queries that have been performed by a user on an electronic program guide, said one or more queries each comprising attribute-value pairs;

generating a combined recommendation score, C, based on said recommendation score, R, and said adjustment, A, for said one or more programs; and providing said combined recommendation score, C, to the user.

2. The method of claim 1, wherein said list of one or more programs is obtained from an electronic program guide.

3. The method of claim 1, wherein said recommendation score, R, is provided by an explicit program recommender.

4. The method of claim 1, wherein said recommendation score, R, is provided by an implicit program recommender.

5. The method of claim 1, wherein said recommendation score, R, is defined as a weighted average of individual ratings of program features.

6. The method of claim 1, further comprising the step of presenting said combined recommendation score, C, for each of said one or more programs to a user.

7. The method of claim 1, wherein said adjustment to said recommendation score, R, does not exceed a predefined value.

8. The method of claim 1, wherein said adjustment to said recommendation score, R, is based on a degree of correlation between attribute-value pairs that define said one or more programs and said attribute-value pairs of said one or more queries that have been performed by a user on an electronic program guide.

9. The method of claim 1, further comprising the steps of decomposing a query to identify said attribute-value pairs contained in said query and incrementing a counter indicating a number of times each of said attribute-value pairs appears in a user query.

10. A method for providing a recommendation score for a television program, comprising the steps of:
   obtaining attributes of said program from an electronic program guide;
   calculating a recommendation score based on a degree of correlation between said attributes and a viewing history and a search history, said search history comprising one or more user-performed queries, each of said one or more user-performed queries including attribute-value pairs; and
   providing said recommendation score to the user.

11. The method of claim 10, wherein said degree of correlation between said attributes and said viewing history is provided by an explicit program recommender.

12. The method of claim 10, wherein said degree of correlation between said attributes and said viewing history is provided by an implicit program recommender.

13. The method of claim 10, wherein said degree of correlation between said attributes and said viewing history is defined as a weighted average of individual ratings of program features.

14. The method of claim 10, further comprising the steps of decomposing a query to identify attribute-value pairs contained in said query and incrementing a counter indicating a number of times each of said attribute-value pairs appears in a user query.

15. The method of claim 10, wherein said viewing history evaluates attributes of programs that have previously been watched by a user.

16. A system for recommending television programs, comprising:
   a memory for storing computer readable code; and
   a processor operatively coupled to said memory, said processor configured to:
      obtain a list of one or more programs;
      obtain a recommendation score, R, for said one or more programs based on a viewing history;
      calculate an adjustment, A, to said recommendation score, R, for said one or more programs based on one or more queries that have been performed by a user on an electronic program guide, said one or more queries comprising attribute-value pairs;
      generate a combined recommendation score, C, based on said recommendation score, R, and said adjustment, A; and
      provide said combined recommendation score, C, to the user.

17. An article of manufacture for recommending television programs, comprising:
   a computer readable medium having computer readable code means embodied thereon, said computer readable program code means comprising code adapted to:
      obtain a list of one or more programs;
      obtain a recommendation score, R, for said one or more programs based on a viewing history;
      calculate an adjustment, A, to said recommendation score, R, based on one or more queries that have been performed by a user on an electronic program guide, said one or more queries each comprising attribute-value pairs;
      generate a combined recommendation score, C, based on said recommendation score, R, and said adjustment, A; and
      provide said combined recommendation score, C, to the user.

* * * * *